United States Patent [19]

Miska et al.

[11] Patent Number: 5,764,644
[45] Date of Patent: Jun. 9, 1998

[54] METHOD AND APPARATUS FOR TRANSPORT OF COMMUNICATION SIGNALS OVER A PUBLIC NETWORK

[75] Inventors: Richard A. Miska, Belle Mead; Albert E. Myers, Matawan, both of N.J.

[73] Assignee: Lucent Technologies Inc., Murray Hill, N.J.

[21] Appl. No.: 581,830

[22] Filed: Jan. 2, 1996

[51] Int. Cl.$^6$ .............................. H04J 3/22; H04L 12/20
[52] U.S. Cl. .............................................. 370/465; 370/545
[58] Field of Search ........................ 370/237, 358, 370/391, 545, 253, 252, 386, 389, 400, 467, 466

[56] References Cited

U.S. PATENT DOCUMENTS

| | | | |
|---|---|---|---|
| 4,375,097 | 2/1983 | Ulug | 370/253 |
| 4,805,171 | 2/1989 | Ewell | 370/496 |
| 5,511,074 | 4/1996 | Lam et al. | 370/253 |
| 5,528,593 | 6/1996 | English et al. | 455/33.1 |
| 5,555,244 | 9/1996 | Gupta et al. | 370/401 |

*Primary Examiner*—Douglas W. Olms
*Assistant Examiner*—Ricky Q. Ngo

[57] ABSTRACT

A method and apparatus for transmitting signals at different rates between an originating device and a destination device. The originating device generates a communication signal, including routing data, for transmitting the communication signal at a native rate associated with the originating device. The communication signal is received by a switch which analyzes the routing data of the signal to identify transmission rates recognizable by the destination device and, if necessary, a transmission path for routing the signal across a backbone network at the native rate. The system then determines whether to re-encode the signal for direct transmission at a different rate recognizable by the destination device, or to maintain the signal at the native rate for transmission either directly to the destination device or across the backbone network. The signal is then transmitted. A destination switch at the destination end analyzes the communication signal to determine the final destination point; if necessary, it re-encodes the communication signal for transmission at a rate which is recognizable by the final destination point, and then transmits the signal to the final destination.

11 Claims, 4 Drawing Sheets

ARCHITECTURAL COMPONENTS
FOR AN END-TO-END CONNECTION

METHOD AND APPARATUS FOR TRANSPORT OF COMMUNICATION SIGNALS OVER A PUBLIC NETWORK

BACKGROUND OF THE INVENTION

1. Field of the Invention

The present invention relates to a process and system for transmission of a communication signal between a source and destination and, more particularly, for transmission of communication signals of at least a predetermined plurality of rates and for treatment of the communication signal at the source and destination ends of the transmission.

2. Description of the Related Art

The process for transmitting a communication signal between two spaced apart locations over a communications link or network is both well known and performed daily throughout the world, as when one initiates a voice telephone call.

In conventional telephony, when a user attempts to place a wireless call, as from a mobile or cellular telephone, the call signal is encoded as a digital wireless signal for transmission at a particular rate (hereinafter referred to as the "native rate") determined by the particular air interface protocol being used by the telephone. Every such phone operatively encodes communication signals at a native rate specific to that telephone and typically determined by the unit's manufacturer. For example, a typical cellular phone encodes signals for transmission at a rate of 8 kilobits per second (Kbps), a typical analog wireline phone encodes signals for transmission at a rate of 56 Kbps, and a typical digital wireline phone encodes signals for transmission at a rate of 64 Kbps. This encoded signal is then transmitted by the phone to a local cell at the native rate. The cell is basically a radio receiver which receives the signal and transmits it to a switch associated with that particular cell through a hardwired connection. Cell technology is well-known and further discussion of such is not deemed necessary. The switch connected to the cell receiving the transmission from the initiating or originating phone is referred to as the "originating switch" and is also connected with numerous other cells from which it also receives wireless communication signals for transmission to individual receivers, e. g., cellular telephones. The switch may also be connected to one or more central offices (CO's) via the Public Switched Telephone Network (PSTN), through which it receives and transmits wireline communication signals to individual receivers, e.g., an analog wireline telephone. The originating switch automatically transforms the wireless signal into a higher bit rate coding signal for wireline transmission, e.g., at 56 Kbps, at which time the destination for the signal is determined. If the destination receiver is connected to a different switch, then a suitable transmission path is identified, and the signal is transported across a backbone network to a remote destination switch. The backbone network is used to connect and provide a communications path between switches positioned all over the world. The destination switch receives the signal transmitted at the wireline transmission rate and identifies the final destination of the signal. If the final destination is a mobile telephone or receiver, the signal is re-encoded into a rate recognizable by the destination switch for wireless transmission to the destination mobile phone. If the destination is a wireline receiver, the signal is transmitted to the destination receiver at a wireline transmission rate recognizable by that device. Thus, it is possible for a particular signal to be encoded from one transmission rate to a second rate and then, at the destination back to the first transmission rate again. In fact, the conventional system used for backbone transport of a communication signal described above encodes a wireless to wireless transmission, for example, into its native rate twice, i.e., once at each end of the transmission path. However, each encoding of the signal by a coder typically degrades the quality of the signal transmission, resulting in a lower Mean Opinion Score (MOS), a conventional, well-known rating system of signal quality. Furthermore, low bit rate speech coders used in conventional phones also introduce distortion and delays which can result in unacceptably degraded service. Because current technology encodes the signal at the native rate twice during a single wireless to wireless transmission, the resulting signal is significantly distorted and delayed.

Furthermore, conventional arrangements are incapable of properly handling the receipt of signals transported across a backbone network at rates other than the accepted wireline rates, especially when special treatment of the signal is required, such as call forwarding to another location or to a voice mailbox.

Conventional switches do not encode the communication signal back to the native rate for a wireless transmission until immediately prior to transmission to the wireless receiver. As a consequence, all analysis of the communication signal to determine its intended destination is performed at the wireline rate. Should a conventional destination switch receive a communication signal transported across a backbone network at a rate other than the wireline rate, it would be unable to properly handle the signal. In order to improve the signal quality of a communication signal by transmission across a backbone network at its native rate, the operation of the switches must also be adapted to transmit, receive and process signals transmitted at a plurality of rates.

SUMMARY OF THE INVENTION

The present invention provides a method and apparatus for improving the quality of a communication signal transmitted across a backbone network between a source and destination and the handling of the communication signal at the ends of the transmission path. In addition, the present invention does not negatively affect the quality of a transmission involving a wireline destination. The signal quality is improved by reducing the number of times that a wireless to wireless transmission of a communication signal is encoded to its native rate. The method and apparatus further provides for transmission, receipt and processing of communication signals at a native rate particular to the transmission device, thus eliminating the need for encoding of the signal to a wireline rate at an originating switch prior to analysis of the signal and transmission to an intended destination. Such signals include, by way of example, wireless cellular signals, wireline analog signals, wireline digital signals, and multimedia signals; each type of signal being encoded for transmission at a native rate particular to the transmission device, similar devices encoding signals for transmission at similar rates. Transmission of the signal across a backbone network at its native rate eliminates the need for encoding of the signal at both ends of a wireless to wireless transmission, since the call will be received by an originating switch at the native rate of the originating transmitting device and then transmitted across the backbone network to a destination switch and through an air link to a destination wireless receiver at, in such case, the same native rate.

Because the signal in a wireless to wireless communication will be encoded to its native rate only once, i.e., by the originating telephone or transmission device, distortion and delay of the signal is significantly reduced as compared to transmissions using conventional techniques. Furthermore, if the destination is a wireline receiver, the quality of the signal transmission will not suffer as the signal will be treated in a similar manner to conventional systems; the only difference will be the particular time or point at which the signal is encoded to a wireline transmission rate.

The present invention also adapts the switches connected to the backbone network so as to be capable of handling receipt of signals at a plurality of rates and of directing the signals to the proper final destination, including signals which require special treatment, such as call forwarding to another phone handled by the same switch, to a voice mailbox, or even to a destination handled by another switch.

The present invention thus provides a method and apparatus for transmitting signals at a plurality of rates between a source transmission device and a destination receiver. The apparatus includes an originating device, such as a telephone, for generating a communication signal including routing data and for transmitting the communication signal at a rate particular to the originating device, i.e., the native rate. The communication signal is received by a local switch which analyzes the routing data of the communication signal to determine the destination device, and if the destination device is connected to a remotely located or "long distance" switch then a transmission path for routing the signal across a backbone network at the native rate of the originating device is determined. Based upon these determinations, the local switch then determines whether the communication signal should be transmitted across the backbone network at the native rate, or transmitted directly to the destination device at the native rate, or converted to a pulse code modulation (PCM) signal for transmission to the destination device. At the destination end, the destination switch for receiving the communication signal analyzes the signal in a similar manner, irrespective of the rate at which the signal was received, to identify the final destination point or receiver. If it is determined during this analysis that the final destination is unable to receive the signal at the native rate, then the destination switch encodes the signal for transmission at a rate which is recognizable by the final destination point and transmit the signal to that destination point. If the analysis reveals that the destination is a wireless receiver which has not answered a page signal, then the user profile of the destination receiver is examined to determine whether a special treatment service for incoming communication signals, such as call forwarding, has been activated; if so, the signal is re-routed to the ultimate destination at the native rate at which it was originally encoded.

The present invention is thus capable of handling the transmission of communication signals between a source transmitting device and a destination receiving device with a vast improvement in signal quality for wireless-wireless transmissions and without degrading the signal quality in other types of transmissions (e.g., wireless-wireline and wireline-wireline transmissions) by adapting the switches to transmit and receive signals transmitted across a backbone network at a wide range of transmission rates instead of only signals transmitted at a wireline rate. Significant advantage is realized by virtue of elimination of an additional encoding step that is used by conventional systems and a reversal in the logic upon which the operation of conventional systems is based. The present invention further modifies the switches used in such transmissions to handle the reversal in logic and the special treatment of transmissions transported across a backbone network at variable rates.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, in which like reference numerals identify similar elements throughout the several views.

DETAILED DESCRIPTION OF THE PRESENTLY PREFERRED EMBODIMENTS

Figure 1:
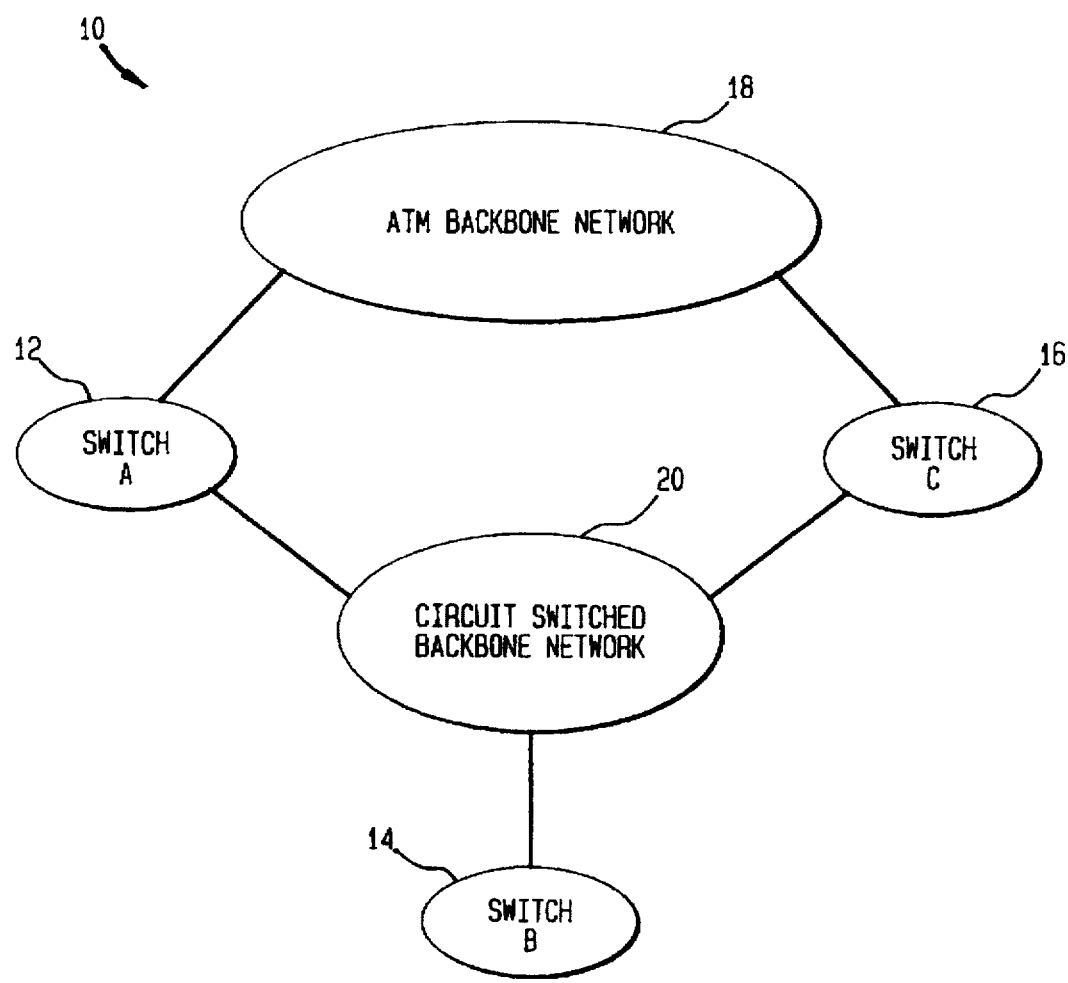
FIG. 1 diagrammatically depicts a communication system supporting wireless and wireline transport across backbone networks, certain switches being able to send signals at a native rate.

FIG. 1 depicts an interconnected system of devices operable for transporting wireline and wireless communication signals across a backbone network and identified by the general reference numeral 10. The system 10 includes "switch A" 12 which supports wireless access, "switch B" 14 which supports wireline access, and "switch C" 16 which supports wireless access. Switches A and C, are connected, for example, by an Asynchronous Transfer Mode (ATM) backbone network 18. In addition, switches A and B are connected to one another, and switches B and C are connected to one another, through, for example, a circuit switched backbone network 20. The structures and components of the ATM and circuit switched backbone networks 18, 20 are well known in the art, and it should in any event be understood that references to these particular types of networks are for purposes of example only and are not intended to limit the method or apparatus of the present invention. Thus, any backbone network can alternatively be employed to connect the switches, an ATM backbone network being currently preferred due to its ability to handle signals of variable rates such as multimedia signals. The wireless switches A and C are thus capable of sending signals at a native rate across an ATM backbone network. Furthermore, although FIG. 1 only illustrates the use of three switches supporting either wireless and wireline access, in practice any number of switches may be connected to the backbone network, such switches variously supporting many different and distinct types of access.

Figure 2:
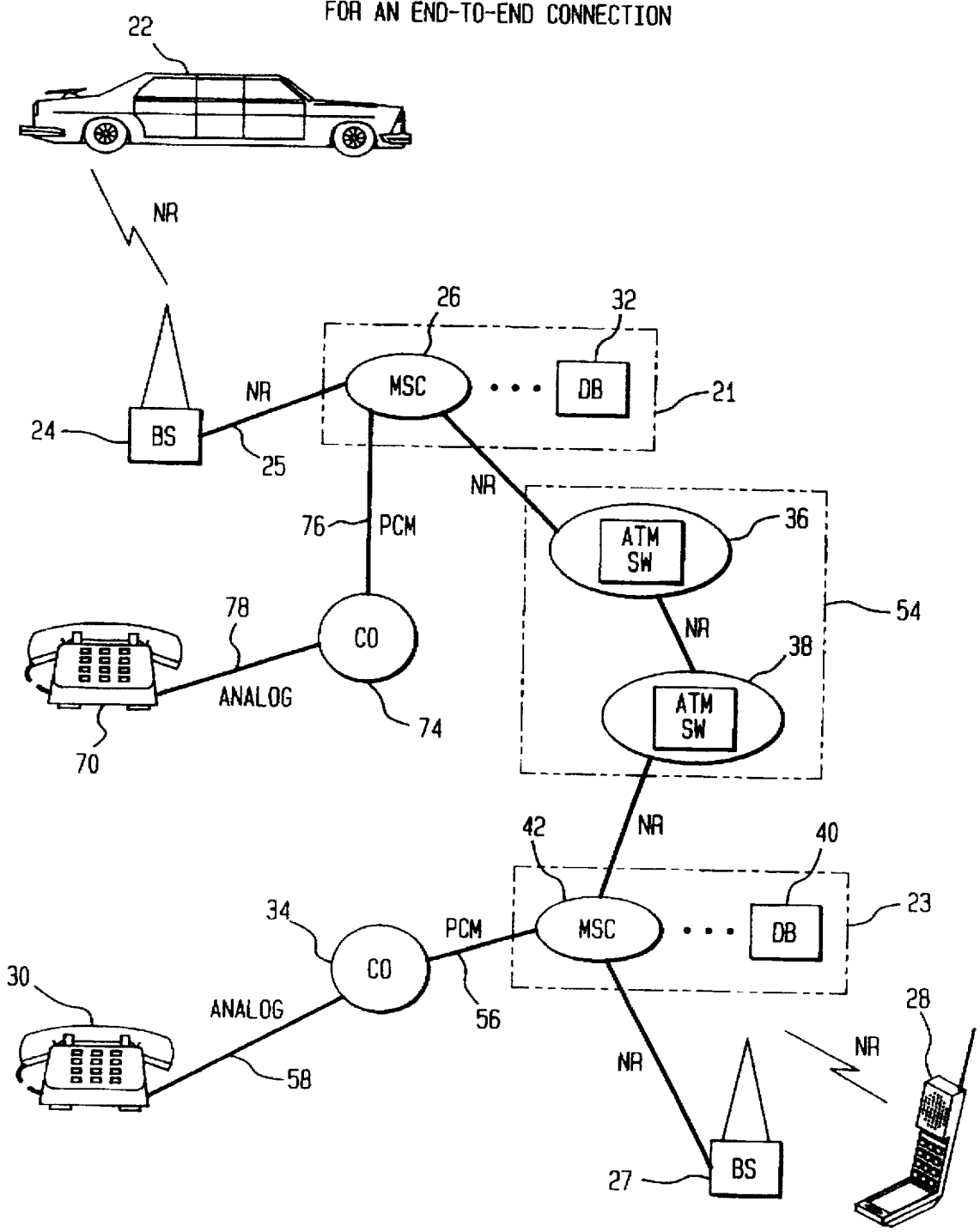
FIG. 2 is a schematic block diagram of a communications transmission path arrangement in accordance with the present invention.
Figure 3:
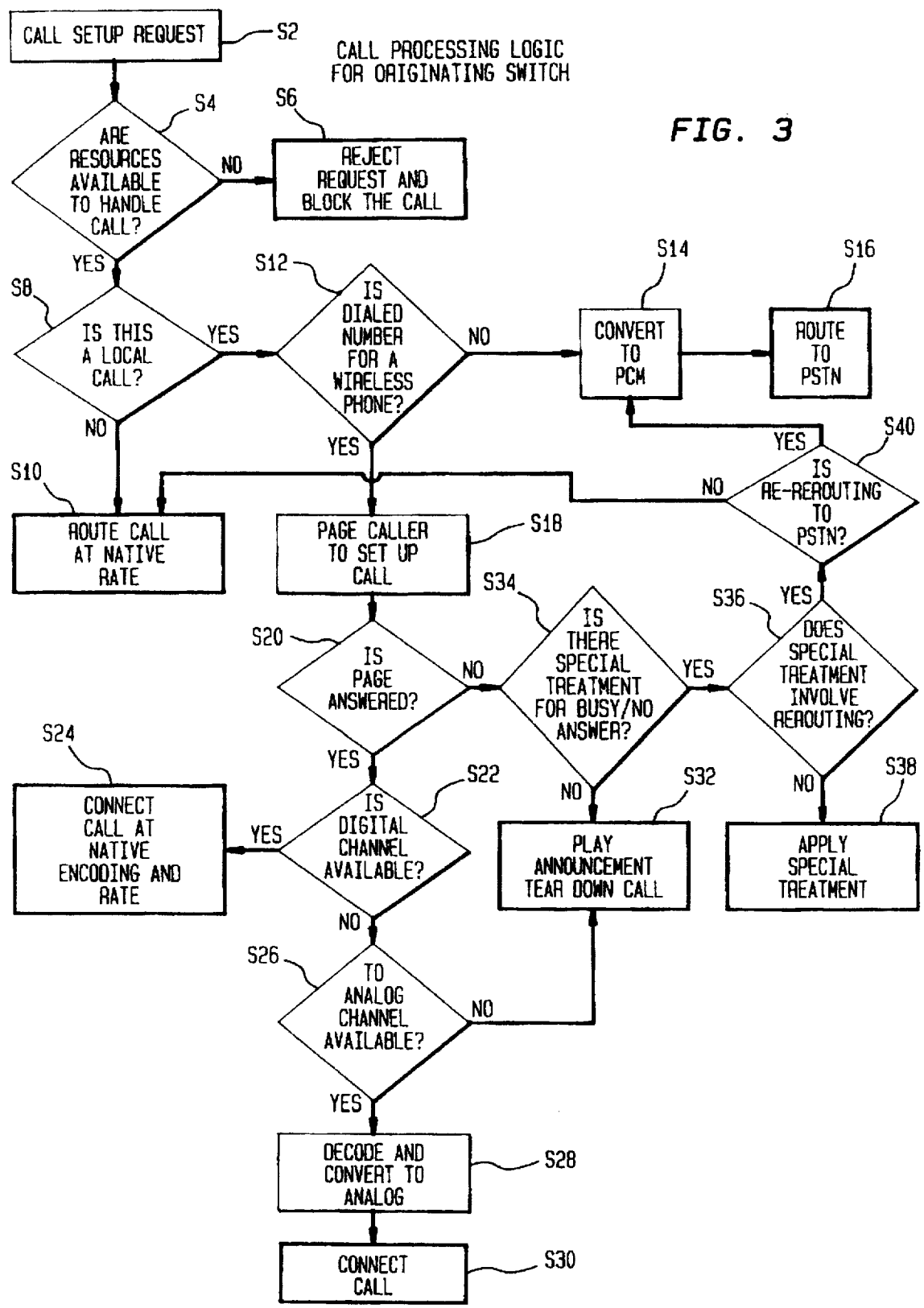
FIG. 3 is a flow chart illustrating a sequence of operations performed by an originating switch in accordance with the present invention.

FIG. 2 schematically depicts the various devices and components forming a typical end to end communication connection in accordance with the present invention and defining a complete transmission path, including connections for any combination of wireless and wireline transmissions. The operation of the system shown in FIG. 2 will now be described in conjunction with the flow chart of FIG. 3 which illustrates the method steps of the present invention practiced at an originating and a destination switch 21 and 23, respectively, during a transmission originating from a wireless source 22. It is nevertheless to be understood that the present invention is not intended to be restricted to transmissions from a wireless source but, rather, is equally applicable to transmissions originating and terminating at any type of transmitter and receiver.

When a user attempts to initiate a communication or call from a mobile cellular phone 22 as in an automobile, the mobile phone 22 is placed in an off-hook mode and a call set-up request, i.e., a coded signal as indicated in step S2, is encoded at a native transmission rate particular to the mobile phone and is wirelessly transmitted. The call set-up request is received at a base station or cell 24 which determines, in step S4, whether the resources are available to handle the transmission (e.g., whether a communication channel is open or available), and transmits a signal back to the mobile phone 22 indicative of the results of this determination. The base station 24 is connected through a wireline 25 to a local switch 21 which may also determine the availability of resources to handle the transmission. If no resources or channels are available, then a signal rejecting the request is transmitted back to the phone and the transmission is blocked, as indicated in step S6.

If the resources are available to handle the transmission a dial tone is transmitted by the base station 24 back to the mobile phone 22, allowing the user to enter a telephone number or routing code. The routing code is encoded for transmission by the phone at the native rate (NR) particular to that phone. Each device operable for transmitting a communications signal encodes the signal for transmission at a manufacturer-selected native rate particular to the device and determined by the particular air interface protocol used by the device; different rates of transmission are typically used for different types of signals such as cellular phone signals, wireline analog signals, wireline digital signals, multimedia signals, etc.

The routing code is transmitted at the native rate from the mobile phone 22 to the base station 24 and then across wireline 25 to the Mobile Switching Center (MSC) 26 of local switch 21. The connection between cell 24 and MSC 26 is conventional and well-known in the art. Local switch 21 analyzes the routing code to determine whether the desired destination is local or requires transmission over a long distance, step S8. As is well-known, each switch acts as a transmission router for numerous individual transmitter and receivers (e.g., telephones); thus, numerous receivers may receive communication signals through a particular switch. Each such receiver is identified by a unique telephone number or routing code and is associated with a respective user profile. The user profile for each receiver is stored in a database 32 within the particular switch providing access to the receiver, and includes information identifying the receiver and the services available thereto. As used herein, a local call is a call that can be handled solely by the originating local switch 21, i.e., the source transmitter device and the destination receiver are both accessible through the same switch.

If the intended destination requires a local call, then the local switch 21 must determine whether the destination receiver 70 is accessed through wireline or wireless transmissions by analyzing the user profile for the respective routing code. At this point, local switch 21 must determine whether the signal should be converted from or remain at its native rate by analyzing the routing code, the user profile or both. Illustratively, and with continued reference to FIG. 2, it is assumed that the destination receiver is an analog wireline phone 70. Accordingly, the transmission is converted to a PCM signal at the local switch 21 and routed along a wireline 76 through a central office (CO) 74, i.e., through the public switched telephone network (PSTN), to the destination receiver 70 associated with the routing code. As the destination receiver 70, in this example, is an analog telephone, the PCM signal is converted to an analog signal at the central office 74 for transmission along a wireline connection 78 to the receiver 70.

As the subsequent handling of the communication signal from this point is the same for all switches, the following description will, for convenience, and by way of example, assume that a long distance communication between remote switches is required.

When it is determined that the call is intended for a destination handled by a remote switch, the MSC 26 determines and plots a transmission path for the call across a backbone network 54 to the remote switch 23 servicing the particular destination receiver identified by the routing code. The transmission across the backbone network 54 occurs at the native rate established by the source transmitting device or mobile phone 22, step S10. The routing of the call is determined by the local or originating switch 21 based upon the received routing code. The call may be routed through a number of intermediate ATM switches 36, 38 along the backbone network 54 until it reaches the destination switch 23. At the destination switch 23, which preferably comprises a MSC 42 and an associated database 40, the communication signal is analyzed to determine whether the intended destination receiver is accessible through a wireless or a wireline transmission. This analysis is performed by reviewing the destination user profile specific to the routing code and stored in the data base 40, step S12. The destination switch 23 then determines whether the signal is to be converted from its native rate to a different rate or to pulse code modulation (PCM) for transmission to the destination device. Illustratively, it is assumed that the destination receiver is an analog wireline phone 30. Accordingly, the transmission is converted to a PCM signal, step S14, and routed through the public switched telephone network (PSTN), step S16, along a wireline 56 through a central office (CO) 34 to the destination receiver 30 associated with the routing code. As the destination receiver 30, in this example, is an analog telephone, the PCM signal is converted to an analog signal at the central office 34 for transmission along a wireline connection 58 to the receiver 30.

If, on the other hand, the destination device must be reached through a wireless transmission, then the MSC 42 of the destination switch 23 transmits a page signal through the destination base station cell 27 to the destination receiver 28 (e. g., a cellular phone) to determine whether it is currently available to receive the transmission, step S18. If it is available, receiver 28 answers the page signal by transmitting a responsive signal indicating such to destination switch 23 through base station cell 27, step S24. Destination switch 23 then checks whether a digital channel is available for transmission of the communication signal to the destination receiver 28, step S22. If a digital channel is available, a connection is established to complete a transmission path between the originating mobile phone 22 and the destination receiver 28, and the communication signal is encoded and transmitted at the native rate from the transmitting device 22 to the wireless destination receiver 28, step S24. As may be appreciated, this signal has been encoded to its native rate only once, at the originating transmitting device 22 and thus is of notably higher quality than a transmission signal that has been encoded more than once as in conventional systems.

If no digital channel is available, step S22, destination switch 23 checks whether an analog channel is available at step S26. If so, the transmission signal is decoded and converted to an analog signal, step S28, and the call connection is completed, step S30, i.e., the now-analog signal is transmitted to the wireless receiver 28. If no analog channel is determined to be available in step S26, then a message or signal is transmitted to originating transmitting device 22 indicating that the transmission cannot be completed (for example, an audio message that the destination device is not available to receive the call, and the transmission is terminated, step S32.

Returning to step S20, if the page signal is not answered or is answered with a negative response indicating unavailability of the destination receiver 28 to receive the transmission, then the MSC 42 checks the destination user profile identified by the routing code and stored in the database 40 of the destination switch 23, step S34, to determine whether the intended transmission is to be handled in some special manner, for example, through call forwarding to another device or location. Absent such special handling instructions, the originating device 22 of the transmission is notified that the transmission cannot be completed and the call is terminated, step S32.

Returning to step S34, if the database 40 indicates that there is a special handling request for the destination indicated by the routing code, then the destination switch 23 determines whether the call should be converted to a PCM signal or whether the call should remain at the native rate. This determination is based upon an analysis of the user profile of the destination receiver 28 and of the alternate destination indicated by the special handling instructions, as for example, whether the call must be re-routed to another switch or to the PSTN, step S36.

If it is determined that the call need not be re-routed to another switch or to the PSTN, the special treatment is applied, step S38, and the call is connected to its destination, e.g., to another wireless phone, a voice mailbox, etc. If re-routing is necessary, it is then determined, step S40, whether such re-routing is to the PSTN or to a remote switch. For re-routing to the PSTN, steps S14 and S16 are performed to convert the signal to PCM and connect the call to its wireline destination. For re-routing to a destination handled by another switch, a transmission path to the new or alternate destination switch is plotted and the call, still at the native rate, is re-routed, step S10, across the backbone network to the alternate destination switch associated with the special treatment instructions for the destination receiver.

The arrangement of the present invention thus does not encode a communication signal for transmission at a rate different from the native transmission rate at which it is originally encoded by the source at least until the ultimate destination has been determined. Only if that destination cannot accept or recognize a transmission at that native rate is the signal then encoded to a different and recognizable rate immediately prior to its transmission. The system of the present invention is accordingly capable of handling signals transmitted at at least a predetermined plurality of rates and operates on the premise that all communication signals are normally transmitted between similar devices, i.e., devices which encode for transmission and which recognize signals transmitted at like rates. Re-encoding of the signal for ultimate transmission to the final destination is only performed at the destination switch if necessary to enable its receipt by the receiving device. Consequently, unnecessary encoding of a signal transmitted between similar devices is avoided and additional signal distortion and degradation caused by unecessary encoding is eliminated. Thus, the present invention operates in contradistinction to the premise of conventional systems which assume that all communication signals are directed to analog wireline receivers and all signals directed to non-analog wireline receivers require re-encoding of the signal as a final step prior to transmission to the ultimate destination.

Figure 4:
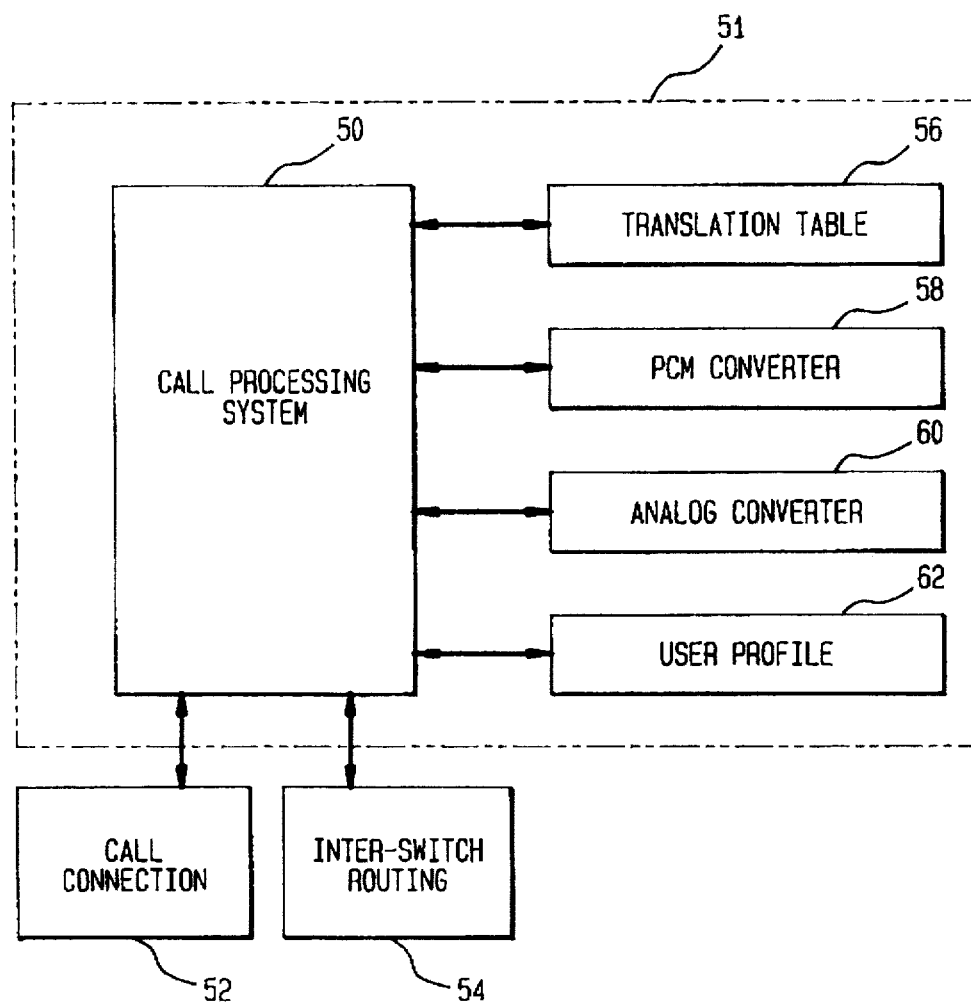
FIG. 4 is a block diagram of a mobile communications switch which forms a part of the system of the present invention.

FIG. 4 depicts the components of a typical switch 51 for use in the practice of the present invention, which may be used as switches 21 and 23 shown in FIG. 2. Each such switch 51 includes a call processing system 50 that operatively attempts to either complete or initiate a connection with an intended destination, as indicated by the box labelled call connection 52, or to route the transmission across a backbone network to a destination determined through analysis of the communication signal; the interswitch routing of a transmission being illustrated by the interswitch routing or backbone network 54 in FIG. 2.

Each switch also includes a translation table 56 for decoding the communication signal destination routing code received from the source for use in plotting a transmission path, a PCM converter 58 for converting the communication signal to a pulse code modulation signal to permit connection of a wireline transmission with a central office for ultimate transmission to the destination receiver, an analog converter 60 for transmission of the communication signal over an analog communication channel, and a user profile 62 which stores a respective user profile for each of the many destination routing numbers that are directly connected to and handled by the specific switch. The user profile 62 identifies the type of service to be provided for each destination receiver connected to the switch, any special treatment accorded to transmissions for each destination receiver, and whether any special treatment that is available to the source has been activated for determining a final destination through either call connection or interswitch routing for transmission completion.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method for transmitting signals between a source device and at least one of a plurality of destination devices, the source device being capable of encoding a signal into an encoded signal identifying at least one of a plurality of destination devices as an intended destination device, the encoded signal having a native rate of transmission, each of the plurality of destination devices being capable of receiving signals having particular characteristics, the method comprising:

a. analyzing the encoded signal to determine the intended destination device for the encoded signal;

b. identifying an ultimate destination device designated by the intended destination device for receipt of signals from a source device;

c. identifying a switch device associated with the ultimate destination device;

d. determining a route of signal transmission from the source device to the switch device;

e. transmitting the encoded signal at the native rate from the source device to the switch device along the route of signal transmission;

f. determining the particular characteristics of signals that are capable of being recognized by the ultimate destination device;

g. analyzing characteristics of the encoded signal and the particular characteristics of signals that are capable of being recognized by the ultimate destination device to determine whether the characteristics of encoded signal are substantially the same as the particular characteristics of signals that are capable of being recognized by the ultimate destination device;

h. upon determining that the characteristics of encoded signal are substantially the same as the particular characteristics of signals that are capable of being recognized by the ultimate destination device in said analyzing step (g), transmitting the encoded signal from the switch device to the ultimate destination device; and i. upon determining that the characteristics of encoded signal are not substantially the same as the particular characteristics of signals that are capable of being recognized by the ultimate destination device in said analyzing step (g):

1. re-encoding the encoded signal at the switch device into a re-encoded signal having characteristics substantially the same as the particular characteristics of signals that are capable of being recognized by the ultimate destination device; and 2. transmitting the re-encoded signal from the switch device to the ultimate destination device.

2. The method of claim 1, wherein the ultimate destination device is the intended destination device.

3. The method of claim 1, wherein the ultimate destination device is a destination device different than the intended destination device.

4. The method of claim 1, wherein the signal characteristics of the encoded signal being analyzed in said analyzing step (g) is the transmission rate and the particular characteristics of signals that are capable of being recognized by the ultimate destination device being analyzed in said analyzing step (g) is a rate of signal reception.

5. The method of claim 1, wherein said step of determining the particular characteristics of signals that are capable of being recognized by the ultimate destination device is performed at the switch device.

6. The method of claim 1, wherein said step of analyzing characteristics of the encoded signal and the particular characteristics of signals that are capable of being recognized by the ultimate destination device is performed at the switch device.

7. The method of claim 1, further comprising:

transmitting an answer signal to the source device in response to receipt of one of the encoded signal and the re-encoded signal by the ultimate destination device to indicate to the source device that the ultimate destination device is capable of receiving the signal from the source device;

establishing a communications connection between the source device and ultimate destination device along the route of signal transmission.

8. An apparatus for transmitting signals between a source device and at least one of a plurality of destination devices, the source device being capable of encoding a signal into an encoded signal identifying at least one of a plurality of destination devices as an intended destination device, the encoded signal having a native rate of transmission, each of the plurality of destination devices being capable of receiving signals having particular characteristics, the apparatus comprising:

first analyzing means for analyzing the encoded signal to determine the intended destination device for the encoded signal;

an ultimate destination device designated by the intended destination device for receipt of signals from a source device, said ultimate destination device being capable of recognizing signals having particular characteristics;

first identifying means for identifying an ultimate destination device designated by the intended destination device for receipt of signals from a source device;

switching means associated with the ultimate destination device for transmitting signals to the ultimate destination device;

second identifying means for identifying the switching means associated with the ultimate destination device;

route determining means for determining a route of signal transmission from the source device to the switching means;

first transmitting means for transmitting the encoded signal at the native rate from the source device to the switching means along the route of signal transmission;

signal characteristic determining means for determining the particular characteristics of signals that are capable of being recognized by the ultimate destination device;

second analyzing means for analyzing characteristics of the encoded signal and the particular characteristics of signals that are capable of being recognized by the ultimate destination device;

re-encoding means for re-encoding the encoded signal at the switching means into a re-encoded signal having characteristics substantially the same as the particular characteristics of signals that are capable of being recognized by the ultimate destination device;

second transmitting means for transmitting one of the encoded signal or the re-encoded signal to the ultimate destination device; and decision means for deciding whether said second transmitting transmits the encoded signal or the re-encoded signal based upon predetermined criteria.

9. The apparatus of claim 8, wherein the characteristics of the encoded signal being analyzed by said second analyzing means is the transmission rate and the particular characteristics of signals that are capable of being recognized by the ultimate destination device being analyzed by said second analyzing means is a rate of signal reception.

10. The apparatus of claim 8, wherein the predetermined criteria considered by said decision means is whether the transmission rate of the encoded signal is substantially the same as a rate of signal reception of the ultimate destination device.

11. The apparatus of claim 8, further comprising:

third transmitting means for transmitting an answer signal to the source device in response to receipt by the ultimate destination device of one of the encoded signal and the re-encoded signal to indicate to the source device that the ultimate destination device is capable of receiving the signal from the source device;

connection means for establishing a communications connection between the source device and ultimate destination device along the route of signal transmission.

\* \* \* \* \*